United States Patent [19]
Yamaki et al.

[11] Patent Number: 5,895,711
[45] Date of Patent: Apr. 20, 1999

[54] HEAT-FIXING ROLL

[75] Inventors: Takeyuki Yamaki; Minoru Inoue, both of Kadoma, Japan

[73] Assignee: Matsushita Electric Works, Ltd., Osaka, Japan

[21] Appl. No.: 08/966,997

[22] Filed: Nov. 10, 1997

[30] Foreign Application Priority Data

Nov. 13, 1996 [JP] Japan .................... 8-302003

[51] Int. Cl.$^6$ ............ B32B 5/16; G03G 15/20
[52] U.S. Cl. .............. 428/328; 428/36.9; 428/36.91; 428/323; 428/331; 428/447; 428/450; 492/53; 492/56; 492/59
[58] Field of Search ................. 428/447, 450, 428/36.9, 36.91, 323, 328, 331; 492/48, 56, 59, 53

[56] References Cited

U.S. PATENT DOCUMENTS

| | | | |
|---|---|---|---|
| 3,268,351 | 8/1966 | Van Dorn | 430/99 |
| 3,498,596 | 3/1970 | Moser | 432/62 |
| 5,679,463 | 10/1997 | Visser et al. | 428/447 |

FOREIGN PATENT DOCUMENTS

| | | |
|---|---|---|
| 6-16839 | 1/1994 | Japan . |
| 6-316690 | 11/1994 | Japan . |
| 8-11243 | 1/1996 | Japan . |

*Primary Examiner*—D. S. Nakarani
*Attorney, Agent, or Firm*—Burns, Doane, Swecker & Mathis, L.L.P.

[57] ABSTRACT

A heat-fixing roll is coated with a hardened silicone coating composition containing such materials (1A) and (1B) or (2A) through (2D) as follows:

(1A) organosiloxane consisting of a hydrolyzed condensation polymer of 20–200 parts by weight of silicon compound $Si(OR^1)_4$ and colloidal silica, 100 parts by weight of silicon compound $R_2Si(OR^1)_3$, and 0–60 parts by weight of silicon compound $R_2Si(OR^1)_2$ ($R^1$ and $R^2$ being monovalent hydrocarbon radicals), with the weight average molecular weight controlled to be more than 800 in polystyrene conversion, and (1B) a straight-chain polysiloxanediol $HO(R^3{}_2SiO)_nH$ ($R^3$ being a monovalent hydrocarbon radical, and $n \geq 3$); or (2A) a silica dispersed oligomer solution of organosilane prepared by partially hydrolyzing a hydrolyzable organosilane $R^4{}_mSiX_{4-m}$ ($R^4$ being the same or different substituted or non-substituted monovalent hydrocarbon radicals of carbon number 1–8, m being an integer 0–3, and X being a hydrolyzable group) within colloidal silica dispersed in an organic solvent, water or their mixture, employing water by 0.001–0.5 mol per 1 mol equivalent amount of the hydrolyzable group (X);

(2B) the same as (1B);

(2C) polyorganosiloxane containing, in molecules, silanol group $R^5{}_aSi(OH)_bO_{(4-a-b)/2}$ ($R^5$ being the same or different substituted or non-substituted monovalent hydrocarbon radicals of carbon number 1–8, and a and b being figures satisfying $0.2 \leq a \leq 2$, $0.0001 \leq b \leq 3$ and $a+b<4$); and (2D) a curing catalyst;

wherein the coated heat-fixing roll has excellent heat resistance, wear resistance, releasability, and long term adhesion between the coating and the heat-fixing roll.

5 Claims, No Drawings

5,895,711

HEAT-FIXING ROLL

BACKGROUND OF THE INVENTION

This invention relates to a heat-fixing roll employed in a contact heat-fixing device of dry electrophotographic reproduction machines, dry electrophotographic printing machines and the like.

DESCRIPTION OF RELATED ART

In dry electrophotography, in general, an image is formed electrophotographically on a photosensitive body with a pigment-containing thermoplastic resin powder (which shall be hereinafter referred to as "toner") employed, and a reproduction is carried out by transferring this formed image of toner onto a transfer paper, and fixing the transferred toner. For fixing the toner, a contact heat-fixing system has been widely utilized, in which system the toner is fixed onto the transfer paper as fused by passing the transfer paper between a heat-fixing roll and a pressure roll brought into contact with each other under a constant pressure. As the heat-fixing roll, there has been employed one having a surface coating of such heat-resisting and releasable substance as fluorocarbon polymers, silicone rubber and the like (see, for example, U.S. Pat. No. 3,268,351 and U.S. Pat. No. 3,498,596). For the pressure roll used in pair with the heat-fixing roll for passing the transfer paper therebetween, a roll comprising such heat-resisting elastic body as silicone rubber, fluorocarbon rubber and the like for providing a certain contacting width (which shall be hereinafter referred to as "nip width") during the contact with the heat-fixing roll. With the advance in recent coloration of the dry electrophotographic reproduction and printing machines and the like, increase in the nip width has been demanded, for which reason the silicone rubber of the elastic body has become the main current of the material for forming the heat-fixing roll. The use of the silicone rubber brings about an advantage that an excellent picture quality is made obtainable by the elasticity provided to the roll surface. However, there has been a problem of a phenomenon (off-set phenomenon) that, in fusing and pressing the toner against the transfer paper by means of the heat-fixing roll, part of the toner supported on first sheet of the transfer papers is caused to adhere to the surface of the heat-fixing roll and is then transferred to a second sheet of the papers, which phenomenon occurring sequentially. Taking this problem into account, the heat-fixing roll is demanded to have both the heat-resistance and the releasability. It has been also known to coat the surface of the heat-fixing roll with a heat-resisting and releasable material in order to prevent the above phenomenon from occurring. For this heat-resisting and releasable material, such fluorocarbon polymers as polytetrafluoroethylene (which shall be hereinafter referred to as "PTFE"), copolymer of tetrafluoroethylene with perfluoroalkylvinylether (which shall be hereinafter referred to as "PFA") and the like, as well as fluorocarbon films and the like.

However, the fluorocarbon polymers and fluorocarbon film are low in the stickiness with respect to other materials, due to their surface chemical structure, and it is difficult to obtain the adherence with respect to the silicone rubber layer. In order to coat the surface of the silicone rubber with the fluorocarbon polymers or fluorocarbon film at a high adherence, therefore, there have been adopted various measures, such as a process of applying a primer as an interlayer; a process of elevating the adherence of the fluorocarbon polymers surface with respect to the silicone rubber layer by etching the fluorocarbon polymers surface with an alkaline metal solution to have the fluorine atoms at the surface liberated and polarized (as shown in, e.g., Japanese Patent Laid-Open Publication No. 6-16839); an integral molding process in which a cylindrical mold of the same inner diameter as a finishing diameter of the roll is held vertically, the fluorocarbon film in a state of being rolled in a cylindrical shape is inserted inside the mold, a roll core shaft is fixed in its center, a fluid silicone rubber is poured into a gap between the film and the core shaft, and the silicone rubber is hardened through a pressurizing and/or heating (as shown in, e.g., Japanese Patent Laid-Open Publications Nos. 8-11243 and 6-316690); and the like. However, these measures are extremely complicated in the coating arrangement, and further a strain is caused to arise in the fluorocarbon polymers as the paper sheets pass in increased number of paper feed since the fluorocarbon polymers is lower in the flexibility than the silicone rubber. Further, when a higher temperature than 200° C. is reached during the fixing, a peeling occurs at adhesive interface between the silicone rubber and the fluorocarbon polymers or fluorocarbon film, so as to cause a partial wrinkle to occur in the surface of fluorocarbon polymers or fluorocarbon film and a cause of the paper clogging. The fluorocarbon polymers and fluorocarbon film are in lack of the resistance to wear, so that the roll using these materials cannot be used for a long term and is required to be exchanged frequently. In view of these respects, the known measures have been troublesome.

Further, as other measures than the above for preventing the off-set phenomenon by coating the surface of the silicone rubber with the fluorocarbon polymers of fluorocarbon film, there has been adopted a process of applying to the surface of the silicone rubber a straight-chain dimethylsilicone having at terminals trimethylsilyl group or a silicone oil consisting of methylphenyl silicone. With these measures, however, there have been still such problems that the silicone rubber is caused to swell by the silicone oil to decrease the strength in the solid state properties, that the silicone oil is caused to change its properties due to the high temperatures to be deteriorated in the releasability, that a special mechanism is required for sequentially supplying the silicone oil to the surface of the silicone rubber, so as to render the arrangement to be complicated.

In addition, even the hard roll in which the metal core of the roll having no silicone rubber layer is directly coated with the fluorocarbon polymers cannot be used for a long term due to the lack of the resistance to wear so as to require the frequent exchange of the roll, while the absence of the silicone rubber layer eliminates the problem of the peeling due to the strain.

SUMMARY OF THE INVENTION

A primary object of the present invention is to provide a heat-fixing roll which is excellent not only in the heat resistance and releasability but also in the long-term adhesion properties between the surface coating layer and the metal roll core or the silicone rubber, and is also high in the resistance to wear.

Further objects and advantages of the present invention shall become clear as the following description of the invention advances as detailed with reference to preferred embodiments.

It should be appreciated that the intention of the description is not to limit the present invention but rather to include all alterations, modifications and equivalent arrangements possible within the scope of appended claims.

According to the present invention, the above object can be realized by means of a heat-fixing roll, in a first aspect, the surface of which is coated by a hardened coating of a silicone coating material composition containing the following materials (1A) and (1B):

(1A) organosiloxane consisting of a hydrolized condensation polymer of (1A$_1$) 20 to 200 parts by weight of silicon compound represented by a general formula Si(OR$^1$)$_4$ and/or colloidal silica, (1A$_2$) 100 parts by weight of silicon compound represented by a general formula R$^2$Si(OR$^1$)$_3$, and (1A$_3$) 0 to 60 parts by weight of silicon compound represented by a general formula R$^2{}_2$Si(OR$^1$)$_2$, (wherein R$^1$ and R$^2$ denote monovalent radicals), and controlled in the weight average molecular weight to be more than 800 in polystylene conversion; and (1B) a straight-chain polysiloxanediol represented by a general formula HO( R$^3{}_2$SiO)$_n$H     (I)

(wherein R$^3$ shows a monovalent hydrocarbon radical, and n≧3).

Further, the above object can be realized also by means of a heat-fixing roll, in a second aspect of the invention, the surface of which is coated by a hardened coating of a silicone coating material composition containing the following materials (2A), (2B), (2C) and (2D):

(2A) a silica dispersed oligomer solution of organosilane prepared by partially hydrolyzing a hydrolyzable organosilane represented by a general formula R$^4{}_m$SiX$_{4-m}$     (II)

(wherein R$^4$ denotes the same or different substituted or non-substituted monovalent hydrocarbon radicals of carbon number 1–8, m is an integer of 0–3, and X denotes a hydrolyzable group) within colloidal silica dispersed in an organic solvent, water or their mixture solvent, and under the conditions of employing water by 0.001 to 0.5 mol per 1 mol equivalent amount of the hydrolyzable group (X);

(2B) a straight-chain polysiloxanediol represented by the general formula

HO(R$^3{}_2$SiO)$_n$H     (I)

(wherein R$^3$ denotes a monovalent hydrocarbon radical, and n≦3);

(2C) polyorganosiloxane containing in molecules silanol group, denoted by an average composition formula R$^5{}_a$Si(OH)$_b$O$_{(4-a-b)/2}$     (III)

(wherein R$^5$ denotes the same or different substituted or non-substituted monovalent hydrocarbon radicals of carbon number 1–8, and a and b are figures respectively satisfying the relationship 0.2≦a≦2, 0.0001≦b≦3 and a+b<4); and (2D) a curing catalyst.

In the foregoing heat-fixing roll of the first and second aspects of the present invention, further, it is preferable that n in the foregoing formula (I) representing the straight-chain polysiloxanediol is in a range of 10≦n≦50.

Further in the foregoing heat-fixing roll of the first and second aspects of the present invention, it is preferable that the silicone coating material composition also contains an acrylic resin of a following (4A):

(4A) an acrylic resin which is a copolymer of monomers represented by a general formula

CH$_2$=CR$^6$(COOR$^7$)     (IV)

(wherein R$^6$ is hydrogen atom and/or a methyl group), which are first (metha) acrylic ester in which R$^7$ is a substituted or non-substituted monovalent hydrocarbon radical of carbon number 1–9, second (metha) acrylic ester in which R$^7$ is at least one radical selected from the group consisting of epoxy group, glycidyl group and hydrocarbon radical containing at least one of the epoxy and glycidyl groups, and third (metha) acrylic ester in which R$^7$ is a hydrocarbon radical containing alkoxysilyl group and/or halogenated silyl group.

In the present specification, the term "(metha) acrylic ester" denotes either one or both of acrylic ester and methacrylate ester.

In the heat-fixing roll of the first or second aspect of the present invention, further, the foregoing silicone coating material composition also should preferably contain at least one selected from the group consisting of fine particles of electrically conducting metal oxide, fine metal particles and electrically conducting carbon.

DETAILED DESCRIPTION OF THE PREFERRED EMBODIMENTS

In a first heat-fixing roll according to the present invention, silicon compounds (1A$_1$)–(1A$_3$) employed as a raw material of organosiloxane (1A) contained in a composition of silicone coating material for use in forming a hardened coat of the roll can be generally represented by a general formula R$^2{}_p$Si(OR$^1$)$_{4-p}$     (V)

(wherein R$^1$ and R$^2$ denote monovalent hydrocarbon radicals, and p is an integer of 0–2).

As R$^2$, while not to be specifically limited, there may be enumerated substituted or non-substituted monovalent hydrocarbon radicals of carbon number 1–8, for example. In concrete, their examples will be such alkyl radicals as methyl group, ethyl group, propyl group, butyl group, pentyl group, hexyl group, heptyl group, octyl group and the like; such cycloalkyl radicals as cyclopentyl group, cyclohexyl group and the like; such aralkyl radicals as 2-phenylethyl group, 3-phenylpropyl group and the like; such aryl radicals as phenyl radical, tolyl radical and the like; such alkenyl radicals as vinyl group, aryl group and the like; such halogen-substituted hydrocarbon radicals as chloromethyl group, γ-chloropropyl group, 3,3,3-trifluoropropyl group and the like; and such substituted hydrocarbon radicals as γ-methacryloxypropyl group, γ-glycidoxypropyl group, 3,4-epoxycychlohexyl ethyl group, γ-mercaptopropyl group and the like. Among them, alkyl radicals of a carbon number 1–4 and phenyl radical will be preferable in view of their easiness of synthesis or availability.

For R$^1$, while not specifically limited, one having alkyl radicals of the carbon number 1–4 as a main material, for example, will be employed.

For tetraalkoxysilane of p=0, in particular, examples will be tetramethoxysilane, tetraethoxysilane and the like, and, for organotrialkoxysilane of p=1, examples will be methyltrimethoxysilane, methyltriethoxysilane, methyltriisopropoxysilane, phenyltrimethoxysilane, phenyltriethoxysilane, 3,3,3-trifluoropropyltrimethoxysilane and the like. For diorganodialkoxysilane of p=2, further, examples will be dimethyldimethoxysilane, dimethyldiethoxysilane, diphenyldimethoxysilane, diphenyldiethoxysilane, methylphenyldimethoxysilane and the like.

These radicals $R^1$ and $R^2$ may be ones mutually identical or even different between the silicon compounds ($1A_1$)–($1A_3$).

While the foregoing organosiloxane (1A) may be prepared by, for example, diluting the materials ($1A_1$)–($1A_3$) with a proper solvent, and prepolymerizing them with an addition of a required amount of water as a curing agent and a catalyst to cause a hydrolysis and a condensation polymerization reaction occurred, the weight-average molecular weight (Mw) of obtainable prepolymer is controlled to be above 800 in polystyrene conversion, preferably more than 850 or more preferably above 900. When the molecular weight distribution (weight-average molecular weight Mw) of prepolymer is below 800, a hardening constriction of the silicone coating material composition upon the condensation polymerization becomes remarkable, so that cracks may easily occur in the coating after being baked.

For the amount by which the raw materials ($1A_1$)–($1A_3$) are used in preparing organosiloxane (1A), their ratio will be, with respect to 100 parts by weight of ($1A_2$), 20 to 200 parts by weight of ($1A_1$)(preferably 40 to 160 parts by weight or more preferably 60 to 120 parts by weight), and 0 to 60 parts by weight of ($1A_3$) (preferably 0 to 40 parts by weight or more preferably 0 to 30 parts by weight). When the amount of ($1A_1$) is less than the above range, there arises a problem that a desired hardness of the hardened coating is not attainable (the hardness is lowered) but, when the amount is more than the above range, there arises another problem that the hardness of the hardened coating becomes too high due to an excessively high crosslinking density so that the crack will readily occur. Further, when the amount of ($1A_3$) is more than the foregoing range, there arises a problem that the desired hardness of the hardened coating is also not attainable (the hardness is lowered).

As a colloidal silica employable as the raw material ($1A_1$), colloidal silica dispersible to water or to such non-water organic solvent as alcohol and the like will be usable. In general, such colloidal silica contains 20 to 50 weight % of silica as a solid content. Further, when the water-dispersible colloidal silica is used, water which is present as other content than the solid content may be used as a curing agent as will be shown later. While they are normally prepared from water-glass, such colloidal silica can be easily obtained in the market. Further, the organic-solvent-dispersible colloidal silica can be easily prepared by substituting the organic solvent for water of the foregoing water-dispersible colloidal silica. Such organic-solvent-dispersible colloidal silica is also easily available in the market, similarly to the water-dispersible colloidal silica. For the type of the organic solvent in which colloidal silica disperses, examples will be such lower aliphatic alcohols as methanol, ethanol, isopropanol, n-butanol, isobutanol and the like; such ethylene glycol derivatives as ethylene glycol, ethylene glycol monobutyl ether, acetic ethylene glycol monoethyl ether and the like; such diethylene glycol derivatives as diethylene glycol, diethylene glycol monobutyl ether and the like; and diacetone alcohol and the like; one or two or more selected from the group consisting of which can be used. It is also possible to use toluene, xylene, ethyl acetate, butyl acetate, methyl ethyl ketone, methyl isobutyl ketone, methyl ethyl ketone, oxime and the like, together with the above hydrophilic organic solvents.

When colloidal silica is used as the raw material ($1A_1$), the foregoing ratio of use of ($1A_1$) is the parts by weight containing the dispersing solvent.

While water is used as the hardening agent employed upon the hydrolysis and condensation polymerization reaction of the raw materials ($1A_1$) to ($1A_3$), the amount of water should preferably be 0.01 to 3.0 mol or, more preferably, 0.3 to 1.5 mol per equivalent weight of 1 mol of $OR^1$ radical of the silicon compounds ($1A_1$)–($1A_3$).

For the diluting solvent used upon the hydrolysis and condensation polymerization reaction of the raw materials ($1A_1$)–($1A_3$), examples will be the foregoing ones referred to as the dispersing solvents of colloidal silica, that is, such lower aliphatic alcohols as methanol, ethanol, isopropanol, n-butanol, isobutanol and the like; such ethylene glycol derivatives as ethylene glycol, ethylene glycol monobutyl ether, acetic ethylene glycol monoethyl ether and the like; such diethylene glycol derivatives as diethylene glycol, diethylene glycol monobutyl ether and the like; and diacetone alcohol and the like; one or two or more selected from the group consisting of which can be used. Further examples which can be used together with these hydrophilic organic solvents will be also toluene, xylene, ethyl acetate, butyl acetate, methyl ethyl ketone, methyl isobutyl ketone, methyl ethyl ketone oxime and the like.

Further, the foregoing organosiloxane (1A) is made stably employable within the foregoing range of molecular weight, by controlling pH of organosiloxane (1A) to be 3.8 to 6. When pH is out of this range, organosiloxane (1A) is deteriorated in the stability, and a term in which the coating material can be used after being prepared is limited. Here, the pH controlling method is, while not to specifically limit, only to control pH which has become less than 3.8 upon mixing of organosiloxane (1A) with the raw materials, for example, to be within the foregoing range by means of such basic reagent as ammonia or the like, whereas pH that has exceeded 6 may be controlled by means of such acid reagent as hydrochloric acid or the like. In an event where the reaction does not proceed with the molecular weight kept as small, depending on pH and it takes time to have the foregoing range of the molecular weight reached, it may be possible to heat organosiloxane (1A) to promote the reaction, or to have pH restored to a predetermined level by means of the basic reagent after lowering pH with the acid reagent to have the reaction proceeded.

In the first heat-fixing roll according to the present invention, in respect of a straight-chain polysiloxane diol contained in the silicone coating material composition employed for forming the hardened coating of the roll is represented by a general formula

wherein $R^3$ may be the monovalent hydrocarbon radical and the same materials as those described as examples of $R^2$ in the foregoing formula (V) can be used. In order to provide an excellent release characteristics to the hardened coating of the silicone coating material composition, dimethyl siloxane diol and methyl phenyl siloxane diol will be preferable.

The straight-chain polysiloxane diol (1B) is in lack of other reactive group than end OH group and is a molecule relatively poor in the reactivity. For this reason, the straight-chain polysiloxane diol (1B) blended in the silicone coating material composition is in lack of complete compatibility within the composition so as to be dispersed therein in the form of ultrafine particles, so that they easily form a coordination at coating film surface to form a monomolecular layer but, eventually, silanol group forming the end reactive group makes the condensation reaction with bulk resin and is fixed at the coating film surface. As a result, a siloxane bond is caused occur locally at a high density at the hardened coating surface, whereby the excellent release characteristics can be provided to the hardened coating of the silicone coating material composition to be effective for a long term. Further, as the straight-chain polysiloxane diol (1B) is excellent in the heat resistance, it is possible to expand offset zone. When "n" in the formula (I) is relatively small, the compatibility is made excellent so that, not only the layer formation at the coating film surface but the hardened coating is also provided with the elasticity and tenacity as being incorporated into the bulk, and the coating is improved in the follow-up characteristics to the thermal expansion of metallic roll core as well as to silicone rubber, so as to be also effective to prevent the crack from occurring.

In the foregoing formula (I), "n" should preferably be in a range of $10 \leq n \leq 50$ and, more preferably, $20 \leq n \leq 40$. When n is less than 10, there is a tendency toward a decrement in the effect of improvement in the release characteristics. When n exceeds 50, there is a tendency toward a decrement in the relative bonding strength between the straight-chain polysiloxane diol (1B) and the bulk coating, so that the former cannot be fixed to the surface of the hardened coating for a long term, and the development of the release characteristics cannot be maintained.

In the silicone coating material composition, the content (composition ratio) of the straight-chain polysiloxane diol (1B) should preferably be 0.1 to 50 parts by weight or, more preferably, 5 to 30 parts by weight, with respect to 100 parts by weight of solid content of organosiloxane (1A). When the content is less than 0.1 part by weight, there is a tendency toward a weakening in the development of the release characteristics. When 50 parts by weight is exceeded, there arises a tendency of causing the hardening of the coating film to be inhibited.

While the silicone coating material composition employed in the first heat-fixing roll of the present invention is not required to contain any curing catalyst so long as the composition is heated to be hardened, the composition may further contain the curing catalyst as required for promoting the hardening of the coating or for hardening the coating under normal temperatures. For the curing catalyst, while not to be specifically limited, examples will be alkyltitanates; such carboxylic acid metallic salts as tin octylic acid, dibutyltin dilaurate, dioctyltin dimaleate and the like; such amine salts as dibutylamine-2-hexoate, dimethylamine acetate, ethanolamine acetate and the like; such carboxylic acid quarternary ammonium salts as tetramethyl acetate ammonium and the like; such amines as tetraethylpentamine and the like; such amine series silane coupling agents as N-β-aminoethyl-γ-aminopropyl methoxy silane, N-β-aminoethyl-γ-aminopropyl methyldimethoxy silane and the like; such acids as p-toluenesulfonic acid, phthalic acid, hydrochloric acid and the like; such aluminum compounds as aluminum alkoxide, aluminum chelate and the like; such alkaline metal salts as lithium acetate, sodium formate, potassium phosphate and the like; such titanium compounds as tetraisopropyl titanate, tetrabutyl titanate, titanium tetraacetylacetonate and the like; and such halogenated silanes as methyltrichlorosilane, dimethyldichlorosilane, trimethylmonochlorosilane and the like. However, the curing catalyst needs not be specifically limited to the above but any others which are effective to the condensation reaction of organosiloxane (1A) are employable.

In a second heat-fixing roll of the present invention, a silica-dispersed oligomer solution (2A) contained in the silicone coating material composition for use in forming the hardened coating is a main component of a base polymer having hydrolyzable group as a functional group contributive to the codensation reaction in the formation of the hardened coating. The solution can be obtained by adding one or more than two of hydrolyzable organosilanes represented by a general formula

to colloidal silica dispersed in an organic solvent or water (including a mixture solvent of organic solvent and water), and partially hydrolyzing the hydrolyzable organosilane under the conditions of using water within the colloidal silica or a separately added water by 0.001 to 0.5 mol per equivalent amount to 1 mol of the hydrolyzable group (X).

For the group $R^4$ in the hydrolyzable organosilanes represented by the above general formula (II), which may be the same or different substituted or non-substituted monovalent hydrocarbon radicals of carbon number 1–8 and need not be specifically limited, examples will be such alkyl radicals as methyl group, ethyl group, propyl group, butyl group, pentyl group, hexyl group, heptyl group, octyl group and the like; such cycloalkyl radicals as cyclopentyl group, cyclohexyl group and the like; such aralkyl radicals as 2-phenylethyl group, 3-phenylpropyl group and the like; such aryl radicals as phenyl radical, tolyl radical and the like; such alkenyl radicals as vinyl group, aryl group and the like; such halogen-substituted hydrocarbon radicals as chloromethyl group, γ-chloropropyl group, 3,3,3-trifluoropropyl group and the like; and such substituted hydrocarbon radicals as γ-methacryloxypropyl group, γ-glycidoxypropyl group, 3,4-epoxycyclohexyl ethyl group, γ-mercaptopropyl group and the like. Among them, alkyl radicals of a carbon number 1–4 and phenyl radicals will be preferable in view of their easiness of synthesis or availability.

For the hydrolyzable group X in the foregoing general formula (II), while not specifically limited, examples will be alkoxy group, acetoxy group, oxime group, enoxy group, amino group, aminoxy group, amide group and the like. Among them, alkoxy group is preferable in view of easy availability and the easiness of preparing the silica dispersed oligomer solution (2A) of organosilane.

Concrete examples of the hydrolyzable organosilane will be such ones of which "m" in the foregoing general formula (II) is an integer of 0–3 as respectively functional mono-, di-, tri- and tetra-alokoxysilanes, acetoxysilanes, oximesilanes, enoxysilanes, aminosilanes, aminoxysilanes, amidesilanes and the like. Among them, alkoxysilanes are preferable in view of their easy availability and easiness in preparing the silica dispersed oligomer solution (2A) of organosilane.

Among alkoxysilanes, examples of tetra-alkoxysilane of m=0 will be tetra-methoxysilane, tetra-ethoxysilane and the like, and examples of organotrialkoxysilane of m=1 will be methylmethoxysilane, methyltriethoxysilane, methyltriisopropoxysilane, phenyltrimethoxysilane, phenyltriethoxysilane, 3,3,3-trifluoropropyltrimethoxysilane and the like. Further, examples of di-organo-di-alkoxysilane of m=2 will be dimethyldimethoxysilane, dimethyldiethoxysilane, diphenyldimethoxysilane, diphenyldiethoxysilane, methylphenyldimethoxysilane and the like, and examples of triorganoalkoxysilane of m=3 will be trimethylmethoxysilane, trimethylethoxysilane, trimethylisopropoxysilane, dimethylisobutylmethoxysilane and the like. Further, organosilane compound referred to as a silane coupling agent in general is also included in alkoxysilanes.

Among the hydrolyzable organosilanes represented by the foregoing general formula (II), ones of more than 50 mol % or preferably more than 60 mol % or more preferably more than 70 mol % are trifunctional and represented by m=1. In case of less than 50 mol %, a sufficient hardness of the coating cannot be attained and the coating is apt to be deteriorated in the dry hardening property.

For the colloidal silica in (2A) component, while not specifically limited, water-dispersed colloidal silica or the colloidal silica dispersed in such non-water series organic solvent as alcohol or the like may be employed. Generally, such colloidal silica contains 20 to 50 weight % of silica as the solid content, and the silica loading can be determined from this content value. In the case when the water-dispersed colloidal silica is employed, water present as other component than the solid content can be utilized for the hydrolysis of the hydrolyzable organosilane and also as the hardening agent of the silicone coating material composition. The water-dispersed colloidal silica, though prepared normally from water-glass, may easily be obtained in the market. Further, the organic solvent-dispersed colloidal silica may easily prepared by substituting the organic solvent for water of the water-dispersed colloidal silica. Such organic solvent-dispersed colloidal silica is also easily available in the market, similarly to the water-dispersed colloidal silica. While not to be specifically limited, the type of the organic solvent in which the colloidal silica is dispersible will be, for example, such lower aliphatic alcohols as methanol, ethanol, isopropanol, n-butanol, isobutanol and the like; such ethylene glycol derivatives as ethylene glycol, ethylene glycol monobutyl ether, ethylene glycol monoethyl ether acetate and the like; such diethylene glycol derivatives as diethylene glycol, ethylene glycol monobutyl ether and the like; and diacetone alcohol, and one or more than two selected from the group consisting of these solvents can be used. Together with these hydrophillic organic solvents, it is also possible to employ toluene, xylene, ethyl acetate, butyl acetate, methyl ethyl ketone, methyl isobutyl ketone, methyl ethyl ketoxime and the like.

While the colloidal silica in the foregoing (2A) component is effective to elevate the hardness of hardened coating of the silicone coating material composition and to improve the smoothness and the resistance to cracking, many silanol groups are contained in the surface of silica particles so that, when its loading is excessive, there may arise a risk that the resin content within toner is caused to easily shift to the hardened coating due to a high polarity of these silanol groups, so as to be a cause of an off-set phenomenon. For this reason, the colloidal silica is contained in the component (2A) preferably in a range of 5 to 95 weight %, more preferably 10 to 90 weight % or the most preferably 20 to 85 weight %, with silica as the solid content. When the content of the colloidal silica is less than 5 weight %, there arises a tendency toward the impossibility of obtaining the desired coating hardness, whereas the content exceeding 95 weight % renders the off-set phenomenon to be easily incurred.

The amount of water employed in preparing the silica dispersed oligomer solution (2A) is, as has been described before, in the range of 0.001 to 0.5 mol per equivalent amount to 1 mol of the hydrolyzable group (X) which the hydrolyzable organosilane has. When the water amount is less than 0.001 mol, no sufficient partial hydrolyzate can be obtained and, when it exceeds 0.5 mol, the partial hydrolyzate becomes unstable. For the process of the partial hydrolization, while not specifically limited, it is only necessary, for example, to mix the hydrolyzable organosilane with the colloidal silica with a required amount of water added and blended, upon which the partial hydrolyzing reaction proceeds under ordinary temperatures. For the purpose of promoting the partial hydrolyzing reaction, it may be possible to heat the mixture (at 60 to 100° C., for example) or to add a catalyst, as required. For this catalyst, while not specifically limited, one or two or more of such organic and inorganic acids as hydrochloric acid, acetic acid, halogenated silane, chloroacetic acid, citric acid, benzoic acid, dimethyl malonic acid, formic acid, propionec acid, glutaric acid, glycolic acid, maleic acid, malonic acid, toluenesulfonic acid, oxalic acid, and the like.

In order that the performance of the (2A) component is stably obtained for a long term, the solution should better be of pH in a range of preferably 2.0 to 7.0, more preferably 2.5 to 6.5 or further preferably 3.0 to 6.0. When pH is out of this range, a decrement in the durability of performance of the (2A) component is remarkable specifically under conditions where the employed water amount is more than 0.3 mol per equivalent amount to 1 mol of the hydrolyzable group (X). When pH is not in the range, it should be controlled with an addition of such basic reagent as ammonia, ethylenediamine and the like in the case of acidic side of the range, or of such acidic reagent as hydrochloric acid, nitric acid, acetic acid or the like in the case of basic side of the range, while the control process should not be specifically limited.

In the second heat-fixing roll of the present invention, a straight-chain polysiloxane diol (2B) contained in the silicone coating material composition for use in forming the hardened coating of the roll is the same one as the straight-chain polysiloxane diol (1B) contained in the silicone coating material composition used in the first heat-fixing roll of the present invention, and its function and effect are also the same.

In the second heat-fixing roll of the present invention, a silanol-group-containing polyorganosiloxane (2C) contained in the silicone coating material composition for use in forming the hardened coating of the roll is a crosslinking agent for forming a three-dimensional crosslinked molecules in the hardened coating through the condensation reaction with the (2A) component which is a base polymer having the hydrolyzable group as the functional group contributive to the hardening reaction, and is a component effective to an absorption of any strain due to the hardening constriction so as to prevent any crack from occurring.

The silanol-group-containing polyorganosiloxane (2C) is represented by an average composition formula

$$R^5{}_a Si(OH)_b O_{(4-a-b)/2} \qquad (III)$$

in which $R^5$ may be exemplified by the same ones as those of $R^4$ in the foregoing formula (II), while will be, preferably, such substituted hydrocarbon radicals as alkyl group of a carbon number of 1 to 4, phenyl radical, vinyl group, γ-glycidoxypropyl group, γ-methacrylopropyl group, γ-aminopropyl group, 3,3,3-trifluoropropyl group and the like, or more preferably methyl group and phenyl radical. Further, in the formula (III), "a" and "b" are numbers satisfying respectively the relationship of $0.2 \leq a \leq 2$, $0.0001 \leq b \leq 3$ and $a+b<4$, since "a" less than 0.2 or "b" exceeding 3 may cause a problem that a crack may occur in the hardened coating. Further, when "a" exceeds 2 but less than 4 or "b" is less than 0.0001, the hardening does not proceed well.

The silanol-group-containing polyorganosiloxane (2C) can be obtained by hydrolizing, for example, methyltrichlorosilane, dimethyldichlorosilane, phenyltrichlorosilane, diphenyldichlorosilane or one or a mixture of two or more of alkoxysilanes corresponding with a large amount of water through any known process, while not specifically limited thereto. When alkoxysilane is hydrolized through the known process for obtaining the silanol-group-containing polyorganosiloxane (2C), there may happen that a trace amount of the alkoxy group not hydrolyzed remains. That is, it may happen that a polyorganosiloxane in which silanol group and a very trace amount of alkoxy group co-exist, and such polyorganosiloxane may also be employed in the present invention without any trouble.

A curing catalyst (2D) contained in the silicone coating material composition for use in forming the hardened coating in the second heat-fixing roll of the present invention is a component which promotes the condensation reaction between both components (2A) and (2C) and hardens the coating. While not specifically limited, examples of the curing catalyst (2D) will be alkyltitanates; such carboxylic acid metallic salts as tin octylic acid, dibutyltin dilaurate, dioctyltin dimaleate and the like; such amine salts as dibutylamine-2-hexoate, dimethylamine acetate, ethanolamine acetate and the like; such carboxylic acid quarternary ammonium salts as tetramethyl acetate ammonium and the like; such amine series silane coupling agents as N-β-aminoethyl-γ-aminopropyl methoxy silane, N-β-aminoethyl-γ-aminopropyl methyldimethoxy silane and the like; such acids as p-toluenesulfonic acid, phthalic acid, hydrochloric acid and the like; such aluminum compounds as aluminum alkoxide, aluminum chelate and the like; such alkaline metal salts as lithium acetate, sodium formate, potassium phosphate, potassium hydroxide and the like; such titanium compounds as tetraisopropyl titanate, tetrabutyl titanate, titanium tetraacetylacetonate and the like; and such halogenated silanes as methyltrichlorosilane, dimethyldichlorosilane, trimethylmonochlorosilane and the like. However, the curing catalyst needs not be limited specifically to them but any others effective to the condensation reaction of the (2A) and (2C) components are employable.

Loading ratio of the (2A) and (2C) components in the silicone coating material composition should preferably be, while needs not be specifically limited, 99 to 1 parts by weight of the (2C) component with respect to 1 to 99 parts by weight of the (2A) component, more preferably 95 to 5 parts by weight of the (2C) component with respect to 5 to 95 parts by weight of the (2A) component, or the most preferably 90 to 10 parts by weight of the (2C) component with respect to 10 to 90 parts by weight of the (2A) component. When the (2A) component is less than 1 part by weight, the hardening characteristics are deteriorated, and there is a tendency toward the impossibility of obtaining sufficient coating hardness. When it exceeds 99 parts by weight, on the other hand, the hardening characteristics are unstable and it happens that an excellent coat cannot be obtained.

Loading ratio of the (2D) component in the silicone coating material composition should preferably be in a range of 0.0001 to 10 parts by weight with respect to 100 parts by weight of the sum of the (2A) and (2C) components, the former being more preferably in a range of 0.0005 to 8 parts by weight or further preferably in a range of 0.0007 to 5 parts by weight. When the loading of (2D) is less than 0.0001 parts by weight, the hardening characteristics are deteriorated, and there is the tendency that no sufficient coating hardness can be attained. When 10 parts by weight is exceeded, the hardened coating is deteriorated in the heat resistance, and the hardened coating becomes too high in the hardness so that there arises a risk of causing the crack to occur.

The loading ratio of the (2B) component in the silicone coating material composition should preferably be in a range of 1 to 50 parts by weight or more preferably be in a range of 5 to 30 parts by weight with respect to 100 parts by weight in the sum solid content of the (2A) and (2C) components. When the loading of (2B) is less than 0.1 part by weight, there is a tendency that the development of the releasing characteristics becomes weak and, when 50 parts by weight is exceeded, there arises a tendency that the hardening of the coating is caused to be inhibited.

In the first or second heat-fixing roll of the present invention, an acrylic resin (4A) contained as required in the silicone coating material composition for use in forming the hardened coating of the roll is effective to improve the tenacity of the hardened coating of the silicone coating material composition.

First (metha) acrylic ester which is one of composing monomer of the acrylic resin (4A) is represented by a general formula $$CH_2=CR^6(COOR^7) \qquad (IV)$$

wherein $R^6$ is hydrogen atom and/or a methyl redical, and $R^7$ is a substituted or non-substituted monovalent hydrocarbon radical of a carbon number of 1 to 9, for example, at least one of such alkyl radicals as methyl group, ethyl group, n-propyl group, i-propyl group, n-butyl group, i-butyl group, sec-butyl group, tert-butyl group, pentyl group, hexyl group, heptyl group, octyl group and the like; such cycloalkyl radicals as cyclopentyl group, cyclohexyl group and the like; such aralkyl radicals as 2-phenylethyl group, 2-phenylpropyl group, 3-phenylpropyl group and the like; such aryl radicals as phenyl radical, tolyl radical and the like; such halogenized hydrocarbon radicals as chloromethyl group, γ-chloropropyl group, 3,3,3-trifluoropropyl group and the like; and such hydroxy hydrocarbon radicals as 2-hydroxyethyl group and the like.

Second (metha) acrylic ester which is another composing monomer of the acrylic resin (4A) is at least one of various monomers in which $R^7$ in the foregoing formula (IV) is at least one radical selected from the group consisting of epoxy group, glycidyl group and hydrocarbon radical containing at least one of these two groups (for example, γ-glycidoxypropyl group and the like).

Third (metha) acrylic ester which is still another composing monomer of the acrylic resin (4A) is at least one of various monomers in which $R^7$ in the foregoing formula (IV) is a hydrocarbon radical containing alkoxysilyl group and/or halogenated silyl group, such as trimethoxysilyl group, dimethoxymethylsilylpropyl group, monomethoxydimethylsilylpropyl group, triethoxysilylpropyl group, diethoxymethylsilylpropyl group, ethoxydimethylsilylpropyl group, trichlorosilylpropyl group, dichloromethylsilylpropyl group, chlorodimethylsilylpropyl group, chlorodimethoxysilylpropyl group, dichloromethoxysilylpropyl group and the like.

The acrylic resin (4A) is a copolymer of (metha) acrylic ester containing at least one of the foregoing first, second and third (metha) acrylic esters or at least three of them in total, or a copolymer, or may be a copolymer containing one or more than two selected from the foregoing first, second and third (metha) acrylic esters, or further one or more than two selected from other (metha) acrylic esters than the above.

The foregoing first (metha) acrylic ester is an essential component which provides the tenacity to the hardened coating of the silicone coating material composition, whereby the hardened coating is caused to follow the thermal expansion of the metallic core of the roll, and to also follow the elastic silicone rubber stably for a long term. For this purpose, it is desirable that the substituted or non-substituted hydrocarbon radical of $R^7$ will have a volume more than a certain extent and preferably a carbon number of more than 2.

The second (metha) acrylic ester is an essential component for maintaining for a long term the adhesive properties of the hardened coating of the silicone coating material composition with respect to the metal roll core or to the silicone rubber.

The third (metha) acrylic ester forms a chemical bond between the ester and organosiloxane upon forming the coating film of the silicone coating material composition, and the acrylic resin (4A) is thereby fixed in the coating film. Further, the third (metha) acrylic ester is also effective to improve the compatibility between the acrylic resin (4A) and the (1A) component, or the compatibility between the acrylic resin (4A) and the (2A) and (2C) components.

The molecular weight of the acrylic resin (4A) relates largely to the compatibility between the acrylic resin (4A) and the (1A) component, or to the compatibility between the acrylic resin (1A) and the (2A) and (2C) components. When the average molecular weight in polystyrene converted weight exceeds 50,000, a phase separation may happen to occur to cause the coating film to be whitened. It is therefore desirable to keep the average molecular weight in the polystyrene converted weight of the acrylic resin (4A) to be below 50,000. The lower limit of this average molecular weight in the polystyrene converted weight should desirably be 1,000 since, with the molecular weight less than 1,000, the coating film is deteriorated in the tenacity so as to cause the tendency toward the easy crack occurrence to arise, not preferably.

The second (metha) acrylic ester should desirably be more than 2% in the monomeric molar ratio within the copolymer since, with the ratio below 2%, there is a tendency that the coating film is insufficient in the adhesivity.

The third (metha) acrylic ester should desirably be in a range of 2 to 50% in the monomeric molar ratio within the copolymer since, with the ratio less than 2%, the compatibility between the acrylic resin (4A) and the (1A) component or between the acrylic resin (4A) and the (2A) and (2C) components is deteriorated so that the coating film may happen to be whitened, whereas, with the ratio exceeding 50%, the bonding density between the acrylic resin (4A) and the (1A) component or between the acrylic resin (4A) and both (2A) and (2C) components becomes too high so that there is a tendency that the improvement in the tenacity as the inherent object of the acrylic resin cannot be shown.

As a synthesizing process for the acrylic resin (4A), any known process for solution polymerization in an organic solution, emulsion polymerization, radical polymerization by means of suspension polymerization, anionic polymerization or cationic polymerization, while not specifically limited thereto.

For the loading of the acrylic resin (4A) within the silicone coating material composition, preferable is 1 to 100 parts by weight or more preferable is 5 to 30 parts by weight with respect to 100 parts by weight in the solid content of the (1A) component for the first heat-fixing roll, or with respect to 100 parts by weight in the sum solid content of both (2A) and (2C) components for the second heat-fixing roll. When the resin is less than 1 part by weight, there is seen a tendency toward a weakening of development of the tenacity but, when exceeds 100 parts by weight, the tendency of causing the hardening of the coating film to be prohibited is shown.

In the first or second heat-fixing roll of the present invention, at least one selected from the group consisting of fine particles of electrically conductive metal oxide, fine metal particles and electrically conductive carbon, is a component acting as an antistatic agent of the fixed roll. As this component is contained, a deposition of toner to the fixing roll and a paper clogging due to copy paper deposition to the fixed roll as a result of the charge in the fixed roll can be prevented from occurring for a long period.

The fine particle of the conductive metal oxide, fine metal particle and conductive carbon should desirably be of a small particle diameter so as not to impair the smoothness of the hardened coating, and preferably be, for example, less than 10 µm.

For the fine particle of the conductive metal oxide, while not specifically limited, examples will be tin oxide, antimony oxide-zinc oxide composite oxide, antimony oxide-tin oxide composite oxide (ATO), indium oxide, and indium oxide-tin oxide composite oxide (ITO), and the like.

For the fine metal particle, while not specifically limited, examples will be copper powder, iron powder, nickel powder, silver powder, gold powder, platinum powder and the like.

For the conductive carbon, while not specifically limited, examples will be carbon black, carbon fiber and the like.

For the shape of the fine particle of conductive metal oxide, fine metal particle and conductive carbon is not limited specifically to the particulate shape, but may be needle-like, fibrous or the like shape, so long as the smoothness of the hardened coating is not impaired. While the sum loading of the fine particle of conductive metal oxide, fine metal particle and conductive carbon should vary depending on the specific electric conductivity of the respective materials, preferable will be 10 to 200 parts by weight or more preferably 50 to 150 parts by weight with respect to 100 parts by weight of total solid content of the silicone coating material composition, in order that the strength or releasing characteristics of the hardened coating will not be impaired.

For the process of manufacturing the first or second heat-fixing roll of the present invention, while not specifically limited, examples will be a process for obtaining the roll as a hard roll by applying the silicone coating material composition directly on the metal roll core, and hardening the applied coating; a process for obtaining the roll as an elastic roll by forming an elastic silicone rubber layer on the surface of the metal roll core, and then applying and hardening the silicone coating material composition on the surface of the elastic silicone rubber layer; and the like. In the case of the hard roll, the nip width will be required to maintained by rendering the elastic layer of the pressure roll to be of a low hardness.

The metal roll core employed in the present invention may not be specifically limited so long as the mechanical strength is sufficient, and may be any of, for example, iron, aluminum, stainless steel and the like.

In the case of the direct apply of the silicone coating material composition to the metal roll core, it may be effective to preliminarily form a layer of primer applied onto the surface of the metal roll core as occasion demands, in order to obtain a still higher adhesion between the hardened coating of the silicone coating material composition and the metal roll core.

In the case of applying the silicone coating material composition to the surface of the elastic silicone rubber layer, the silicone rubber material for the elastic layer has no specific limitation and may be selected taking into account the hardness and elasticity capable of attaining the required nip width, or the heat resistance. In order to further increase the adhesion strength between the hardened coating of the silicone coating material composition and the elastic silicone rubber layer, as occasion demands, it is also possible to perform a primer treatment preliminarily on the surface of the elastic silicone rubber layer to have a primer layer formed thereon, and thereafter to form the hardened coating layer of the silicone coating material composition on the surface of this primer layer.

For composing material of the primer layer, while not specifically limited, the material may be selected with the adhesion and heat resistance taken into account. The primer layer should preferably have a thickness of 1 to 50 μm, more preferably 0.5 to 10 μm, while not specifically limited. With this thickness too small, the required adhesion cannot be obtained and, with the thickness too large, there arises a risk of causing a blowing to occur.

The process for applying the silicone coating material composition employed in the present invention is not specifically limited, but any of such ordinary applying processes as brushing, spraying, dipping, rolling and the like may be selected.

The silicone coating material composition employed in the present invention may be used as diluted with any of various organic solvents as required for the easiness of handling, or the composition may be one which is already diluted by the organic solvent. Examples of such organic solvent will be such lower aliphatic alcohols as methanol, ethanol, isopropanol, n-butanol, isobutanol and the like; such ethylene glycol derivatives as ethylene glycol, ethylene glycol monobutyl ether, acetic ethylene glycol monoethyl ether and the like; such ethyl glycol derivatives as diethylene glycol, diethylene glycol monobutyl ether and the like; as well as toluene, xylene, hexane, heptane, ethyl acetate, butyl acetate, methyl ethyl ketone, methyl isobutyl ketone, methyl ethyl ketoxime, diacetone alcohol and the like, and one or more than two selected from the group consisting of the above will be employable. Diluting ratio of the organic solvent is not specifically limited, and may be determined as occasion demands.

The silicone coating material composition employed in the present invention may include, as required, such additives as a thickening agent, coupling agent, leveling agent to an extent of not giving any influence on the effect of the present invention.

For the process of hardening the applied silicone coating material composition, any known process may be adopted and no limitation will be required.

Further, the temperature for the hardening is not specifically limited, and may be in a wide range of ordinary to heating temperatures in accordance with the desired hardened coating characteristics.

The thickness of the hardened coating formed by the silicone coating material composition needs not be specifically limited and may be about 0.1 to 50 μm, for example, whereas, in the case of the hard roll, the thickness should preferably be 1 to 30 μm in order that the hardened coating is stably adhered and held to the metal roll core for a long term and the excellent releasing characteristics are maintained. In the case of the elastic roll, the thickness should preferably be 1 to 20 μm, in order that the hardened coating is adhered and held to the silicone rubber layer for the long term while maintaining the excellent releasing characteristics, that the coating can follow the elasticity of the silicone rubber without causing any crack or peeling to occur, and that the nip width is not influenced.

EXAMPLES

The present invention shall be described in detail in the followings with reference to Examples and Comparative Examples in the followings. In these Examples and Comparative Examples, the term "part" denotes the "part by weight", and "%" denotes the "weight %", throughout. Further, the molecular weight has been measured by preparing a calibration curve with a standard polystyrene by means of GPC (Gel Permeation Chromatography) and using a measuring device (HLC8020 manufactured by TOHSO). The present invention is not limited to the following Examples.

1A Component Preparation Example

Preparation Example 1A

With 100 part of methyltrimethoxysilane, 60 parts of IPA organosilica sol (trade name "OSCAL1432" by SHOKUBAI KASEI KOGYO, solid content 30%) has acidic colloidal silica and 30 parts of dimethyldimethoxysilane were mixed, then the mixture was diluted with 100 parts of isopropyl alcohol (which shall be referred to as IPA in the following) and was stirred with 39 parts of water added. Thus obtained liquid was heated for 5 hours in a constant temperature bath of 60° C. to be prepared to have a weight average molecular weight Mw=1,200, and an alcohol solution of organosiloxane 26% was obtained This solution shall be referred to as "1A".

Preparing Conditions of 1A:

(water)/(OR$^1$) mol ratio: 1.15

Weight average molecular weight: 1,200

Solid content: 26%

1B, 2B Component (Straight-chain polysiloxanediol):

The straight-chain dimethylpolysiloxanediol of which weight average molecular weight Mw=800 (n=11).

The straight-chain dimethylpolysiloxanediol of which weight average molecular weight Mw=3,000 (n=40).

2A Component Preparation Example

Preparation Example 2A

Into a flask provided with a stirrer, warming jacket, condenser and thermometer, 100 parts of isopropanol-dispersed colloidal silica sol IPA-ST (particle diameter 10–20 nm, solid content 30%, water content 0.5%, manufactured by NISSAN KAGAKU KOGYO), 68 parts of methyltrimethoxysilane and 10.8 parts of water were introduced, a mixture of them was subjected to the partial hydrolysis reaction while being stirred at a temperature of 65° C. for about 5 hours and then to a cooling, and a 2A component was obtained. This product has shown a solid content of 36% after being left to stand at the room temperature for 48 hours.

Preparing Conditions for 2A Component

Molar number of water with respect 0.4 to 1 mol of hydrolyzable group

Silica content in 2A component 47.3%

Mol % of organosilane containing 100 mol % hydrolyzable group of n=1

2C Component Preparation Example

Preparation Example 2C

Into a flask provided with a stirrer, warming jacket, condenser, dropping funnel and thermometer, 1,000 parts of water and 50 parts of acetone were introduced as measured, and their mixture solution was subjected to the hydrolysis while dropping in stirring state a solution, into 200 parts of toluene, of 44.8 parts (0.3 mol) of methyltrichlorosilane, 38.7 parts (0.3 mol) of dimethyl dichlorosilane and 84.6 parts (0.4 mol) of phenyltrichlorosilane. The stirring was stopped after 40 minutes of the dropping, the solution subjected to the reaction was transferred into a separatory funnel and was left at rest therein, a hydrochloric acid water forming a lower one of two separated layers was removed, then, water and hydrochloric acid remaining in the toluene solution of organopolysiloxane forming an upper one of the two separated layers were removed together with excessive toluene by means of a vacuum stripping, and a 60% toluene solution of silanol-group-containing organopolysiloxane of about 3,000 in the weight average molecular weight was obtained. This solution is referred to as 2C.

2D Component

N-β-aminoethyl-γ-aminopropylmethyldimethoxysilane.

4A Component Preparation Example

Preparation Example 4A

Within a flask provided with a stirrer, warming jacket, condenser, dropping funnel, nytrogen gas inlet and outlet ports and thermometer, a solution of 0.025 parts of azobisisobutyronitrile into 3 parts of toluene was dropped under a nytrogen stream into a reaction solution of 5.69 parts of n-butylmethacrylate (BMA), 1.24 parts of trimethoxysilylpropylmethacrylate (SMA), 0.71 parts of glycidylmethacrylate (GMA) and further 0.78 parts of γ-mercaptopropyltrimethoxysilane as a chain transfer agent into 8.49 part of toluene, and the whole was subjected to the reaction for 2 hours at 70° C. As a result, a 40% toluene solution of acrylic resin of the weight average molecular weight Mw=1,000 was obtained. This acrylic resin solution obtained here is referred to as 4A.

Preparation Conditions for 4A

Monomer mol ratio: BMA/SMA/GMA=8/1/1

Wt. Av. Mol. Wt.: 1,000

Solid content: 40%

EXAMPLE 1

A marketed silicone rubber-use primer was applied on an aluminum core of a diameter and length 5×300 mm, then a silicone coating material composition of such composition as in the following was applied by means of the spraying, they were dried at 200° C. for 20 minutes to be hardened, and a hard heat-fixing roll of a hardened coating thickness of 10 μm was obtained.

The composition of silicone coating material composition:

100 parts of the organosiloxane solution (1A) obtained at Preparation Example 1A, with which 4 parts of the straight-chain dimethylpolysiloxanediol of the weight average molecular weight Mw=800 (n≈11) and 2 parts of the straight-chain dimethylpolysiloxanediol of the weight average molecular weight Mw=3,000 (n≈40) were mixed and stirred.

Thus obtained hard heat-fixing roll was incorporated as the fixing roll into PPC copying machine, the copying of 100,000 sheets was performed under a roll pressure of 3 kgf/cm$^2$, and excellent copies could be obtained without any abnormality seen on the roll itself.

EXAMPLE 2

A silicone coating material composition of a following composition was applied by means of the spraying on the aluminum core of a diameter and length 50×300 mm, and was dried at 200° C. for 20 minutes to be hardened, and a hard heat-fixing roll of a hardened coating thickness of 10 μm was obtained.

The composition of silicone coating material composition:

100 parts of the organosiloxane solution (1A) obtained at Preparation Example 1A, to which 4 parts of the straight-chain dimethylpolysiloxanediol of the weight average molecular weight Mw=800 (n≈11) and 2 parts of the straight-chain dimethylpolysiloxanediol of the weight average molecular weight Mw=3,000 (n≈40) were added and stirred, to which mixture, further, 20 parts of the acrylic resin solution (4A) obtained at Preparation Example 4A was added and stirred.

Thus obtained hard heat-fixing roll was incorporated as the fixing roll into the PPC copying machine, the copying of 100,000 sheets was performed under the roll pressure of 3 kgf/cm$^2$, and excellent copies could be obtained without any abnormality seen on the roll itself.

EXAMPLE 3

A silicone coating material composition of a following composition was applied by means of the spraying on the aluminum core of the diameter and length 50×300 mm, and was dried at 200° C. for 20 minutes to be hardened, and a hard heat-fixing roll of the hardened coating thickness of 10 μm was obtained.

The composition of silicone coating material composition:

20 parts of the 2A component obtained at Preparation Example 2A, with which 50 parts of silanol-group-containing organopolysiloxane solution (2C) obtained at Preparation Example 2A, 10 parts of the straight-chain dimethylpolysiloxanediol of the weight average molecular weight Mw=800 (n≈11), 3 parts of the straight-chain dimethylpolysiloxanediol of the weight average molecular weight Mw/3,000 (n≈40) and 26 parts of the acrylic resin solution (4A) obtained at Preparation Example 4A were added, and further 2 parts of the hardening catalyst (the foregoing 2D component: N-β-aminoethyl-γ-aminopropylmethyldimethoxysilane) were mixed and stirred.

Thus obtained hard heat-fixing roll was incorporated as the fixing roll into the PPC copying machine, and the copying of 100,000 sheets under the roll pressure of 3 kgf/cm$^2$ and excellent copies could be obtained without any trouble seen on the roll itself.

EXAMPLE 4

An addition reaction type, liquid silicone-rubber-use primer was applied on the surface of the aluminum core of the diameter and length 50×300 mm, thus formed primer layer was coated with an addition reaction type, liquid silicone rubber of a rubber hardness 60° (2 mm thick), the silicone coating material composition of such composition as in the following was applied by means of the spraying further on the surface of the rubber coating, they were dried at 200° C. for 20 minutes to be hardened, and an elastic heat-fixing roll having the hardened coating 5 μm thick was obtained.

The composition of silicone coating material composition:

100 parts of the organosiloxane solution (1A) obtained at Preparation Example 1A, with which 4 parts of the straight-chain dimethylpolysiloxanediol of the weight average molecular weight Mw=800 (n≈11) and 2 parts of the straight-chain dimethylpolysiloxanediol of the weight average molecular weight Mw=3,000 (n≈40) were mixed and stirred.

Thus obtained elastic heat-fixing roll was incorporated as the fixing roll in the PPC copying machine, the copying of 100,000 sheets was performed under the roll pressure of 3 kgf/cm$^2$, and excellent copies could be obtrained without any trouble seen on the roll itself.

EXAMPLE 5

The addition reaction type liquid silicone-rubber-use primer was applied on the surface of the aluminum core of the diameter and length 50×300 mm, thus formed primer layer was coated with an addition reaction type liquid silicone rubber of the rubber hardness 60° (20 mm thick), further the silicone coating material composition of such composition as in the following composition was applied on the surface of the rubber coating by means of the spraying, they were dried at 200° C. for 20 minutes to be hardened, and an elastic heat-fixing roll of the hardened coating 5 μm thick was obtained.

The composition of silicone coating material composition:

100 parts of the organosiloxane solution (1A) obtained at Preparation Example 1A, with which 4 parts of the straight-chain dimethylpolysiloxanediol of the weight average molecular weight Mw=800 (n≈11) and 2 parts of the straight-chain dimethylpolysiloxanediol of the weight average molecular weight Mw=3,000 (n≈40) were added, and further 20 parts of the acrylic resin solution (4A) obtained at Preparation Example 4A were mixed and stirred.

Thus obtained elastic heat-fixing roll was incorporated as the fixing roll into the PPC copying machine, the copying of 100,000 sheets was performed under the roll pressure of 3 kgf/cm$^2$, and excellent copies could be obtained without any trouble seen in the roll itself.

EXAMPLE 6

The addition reaction type liquid silicone-rubber-use primer was applied on the surface of the aluminum core of the diameter and length 50×300mm, thus formed primer layer was coated with the addition reaction type liquid silicone rubber of the rubber hardness 60° (2 mm thick), further the silicone coating material composition of such composition as in the following composition was applied on the surface of the rubber coating by means of the spraying, they were dried at 200° C. for 20 minutes to be hardened, and an elastic heat-fixing roll of the hardened coating 5 μm thick was obtained.

The composition of silicone coating material composition:

50 parts of the 2A component obtained at Preparation Example 2A, with which 50 parts of the silanol-group-containing organopolysiloxane solution (2C) obtained at Preparation Example 2C, 10 parts of the straight-chain dimethylpolysiloxanediol of the weight average molecular weight Mw=800 (n≈11), 3 parts of the straight-chain dimethylpolysiloxanediol of the weight average molecular weight Mw=3,000 (n≈40) and further 2 parts of the hardening catalyst (the foregoing 2D component: N-β-aminoethyl-γ-aminoprophylmethyldimethoxysilane) were mixed and stirred.

Thus obtained elastic heat-fixing roll was incorporated as the fixing roll into the PPC copying machine, the copying of 100,000 sheets was performed under the roll pressure of 3 kgf/cm$^2$, and excellent copies could be obtained without any trouble seen on the roll itself.

EXAMPLE 7

The addition reaction type liquid silicone-rubber-use primer was applied on the surface of the aluminum core of the diameter and length 50×300 mm, thus formed primer layer was coated with the addition reaction type silicone rubber of the rubber hardness 60° (2 mm thick), further the silicone coating material composition of the following composition was applied on the surface of the rubber coating by means of the spraying, they were dried at 200° C. for 20 minutes to be hardened, and an elastic heat-fixing roll of the hardened coating 5 μm thick was obtained.

The composition of silicone coating material composition:

50 parts of 2A component obtained at Preparation Example 2A, to which 50 parts of the silanol-group-containing organopolysiloxane solution (2C) obtained at Preparation Example 2C, 10 parts of the straight-chain dimethylpolysiloxanediol of the weight average molecular weight Mw=800 (n≈11), 3 parts of the straight-chain dimethylpolysiloxanediol of the weight average molecular weight Mw=3,000 (n≈40), and 26 parts of the acrylic resin solution (4A) obtained at Preparation Example 4A were added, further, 2 parts of the hardening catalyst (the foregoing 2D component:N-β-aminoethyl-γ-aminopropylmethyldimethoxysilane) was mixed therewith as stirred, in which mixture 12 parts of vapor phase grown carbon fiber (VGCF, average fiber diameter 25 nm) were dispersed.

Thus obtained elastic heat-fixing roll was incorporated into the PPC copying machine as the fixing roll, the copying of 100,000 sheets was performed under the roll pressure of 3 kgf/cm$^2$, and excellent copies could be obtained without any trouble seen on the roll itself.

Comparative Example 1

The marketed silicone-rubber-use primer was applied on the aluminum core of the diameter and length 50×300 mm, then a silicone coating material composition of such composition as follows was applied thereon by means of the spraying, they were dried at 200° C. for 20 minutes to be hardened, and a hard heat-fixing roll of a hardened coating 10 μm thick was obtained.

The composition of silicone coating material composition:

100 parts of the organosiloxane solution (1A) obtained at Preparation Example 1A, with which 20 parts of the acrylic resin solution (4A) obtained at preparation Example 4A were mixed and stirred.

Thus obtained hard heat-fixing roll was incorporated into the PPC copying machine as the fixing roll, and the copying test with this roll mounted was performed, as a result of which the off-set phenomenon has occurred at 500th sheet.

Comparative Example 2

The addition reaction type liquid silicone-rubber-use primer was applied to the surface of the aluminum core of the diameter and length, thus formed primer layer was coated with the addition reaction type liquid silicone rubber of the rubber hardness 60° (2 mm thick), a silicone coating material composition of the following composition was applied to the surface of the rubber coating by means of the spraying, they were dried at 200° C. for 20 minutes to be hardened, and an elastic heat-fixing roll of the hardened coating 5 μm thick was obtained.

The composition of silicone coating material composition:

50 parts of 2A component obtained at Preparation Example 2A, to which 50 parts of the silanol-group-containing organopolysiloxane solution (2C) obtained at Preparation Example 2C and 26 parts of the acrylic resin solution (4A) obtained at Preparation Example 4A were added, and with which further 2 parts of the hardening catalyst (the foregoing 2D component: N-β-aminoethyl-γ-aminopropylmethyldimethoxysilane) were mixed and stirred.

Thus obtained elastic heat-fixing roll was incorporated into the PPC copying machine as the fixing roll, and the copying test with the roll mounted was performed under the roll pressure of 3 kgf/cm², as a result of which the off-set phenomenon occurred at 5,500th sheet.

Comparative Example 3

The addition reaction type liquid silicone-rubber-use primer was applied to the surface of the aluminum core of the diameter and length 50×300 mm, thus formed primer layer was coated with the addition reaction type liquid silicone rubber of the rubber hardness 60° (2 mm thick), thus coated roll was covered with PFA film (4 μm) etching-treated with a metallic sodium solution and was subjected to a pressure molding, and an elastic heat-fixing roll was obtained.

Thus obtained elastic heat-fixing roll was incorporated into the PPC copying machine as the fixing roll, and the copying test with the roll mounted and under the roll pressure of 3 kgf/cm², as a result of which a paper clogging occurred with an abnormal sound at 26,000th sheet, upon which the upper PFA film layer on the surface of the roll was found as partly peeled off.

What is claimed is:

1. A heat-fixing roll, the surface of which is coated with a hardened coating of a silicone coating material composition containing the following materials (1A) and (1B):

(1A) organosiloxane consisting of a hydrolyzed condensation polymer of 20 to 200 parts by weight of at least one of silicon compound represented by a general formula $Si(OR^1)_4$ or colloidal silica, 100 parts by weight of silicon compound represented by a general formula $R^2Si(OR^1)_3$, and 0 to 60 parts by weight of silicon compound represented by a general formula $R^2_2Si(OR^1)_2$, wherein $R^1$ and $R^2$ denote monovalent hydrocarbon radicals, and controlled in the weight average molecular weight to be more than 800 in polystyrene conversion; and (1B) a straight-chain polysiloxanediol represented by a general formula $$HO(R^3_2SiO)_nH \quad (I)$$

wherein $R^3$ is a monovalent hydrocarbon radical, and $n \geq 3$.

2. A heat-fixing roll, the surface of which is coated with a hardened coating of a silicone coating material composition containing the following materials (2A), (2B), (2C) and (2D):

(2A) a silica dispersed oligomer solution of organosilane prepared by partially hydrolyzing, within colloidal silica dispersed in an organic solvent, water or their mixture, a hydrolyzable organosilane represented by a general formula $$R^4_mSiX_{4-m} \quad (II)$$

wherein $R^4$ denotes alkyl, cycloalkyl, aralkyl, aryl, alkenyl, halogen, γ-methacrylopropyl, γ-grycidoxypropyl, 3,4-epoxycyclohexyl ethyl or γ-mercaptopropyl substituted or non-substituted monovalent hydrocarbon radicals of carbon number 1–8, m is an integer of 0–3, and X denotes a hydrolyzable group, and under the conditions of employing water by 0.001 to 0.5 mol per 1 mol equivalent amount of the hydrolyzable group (X);

(2B) a straight-chain polysiloxanediol represented by a general formula $$HO(R^3_2SiO)_nH \quad (I)$$

wherein $R^3$ denotes a monovalent hydrocarbon radical, and $n \geq 3$;

(2C) polyorganosiloxane containing silanol group in molecules, denoted by an average composition formula $$R^5_aSi(OH)_bO_{(4-a-b)/2} \quad (III)$$

wherein $R^5$ denotes alkyl, phenyl, vinyl, γ-grycidoxypropyl, γ-methacrylopropyl, γ-aminopropyl or 3,3,3-trifluoropropyl substituted or non-substituted monovalent hydrocarbon radicals of carbon number 1–8, and a and b are figures respectively satisfying the relationship $0.2 \leq a \leq 2$, $0.0001 \leq b \leq 3$ and $a+b<4$; and (2D) a curing catalyst.

3. The heat-fixing roll according to claim 1 wherein n in the formula (I) representing the straight-chain polysiloxanediol is within a range of $10 \leq n \leq 50$.

4. The heat-fixing roll according to claim 1 wherein the silicone coating material composition also contains an acrylic resin of following (4A):

(4A) an acrylic resin which is a copolymer of first, second and third monomers represented by a general formula $$CH_2=CR^6(COOR^7) \quad (IV)$$

wherein $R^6$ is at least one of hydrogen atom or a methyl group, which are first (metha) acrylic ester in which $R^7$ is a alkyl, cycloalkyl, aralkyl, aryl, halogen, γ-chloropropyl, 3,3,3-trifluoropropyl or 2-hydroxyethyl substituted or non-substituted monovalent hydrocarbon radical of carbon number 1–9, second (metha) acrylic ester in which $R^7$ is at least one radical selected from the group consisting of epoxy group, glycidyl group and hydrocarbon radical containing at least one of the epoxy and glycidyl group, and third (metha) acrylic ester in which $R^7$ is at least one of hydrocarbon radical containing alkoxysilyl group or halogenated silyl group.

5. The heat-fixing roll according to claim 1 wherein the silicone coating material composition contains at least one selected from the group consisting of particles of electrically conducting metal oxide having a diameter less than 10 μm, metal particles having a diameter less than 10 μm, and electrically conducting carbon.

* * * * *